Patented Mar. 17, 1931

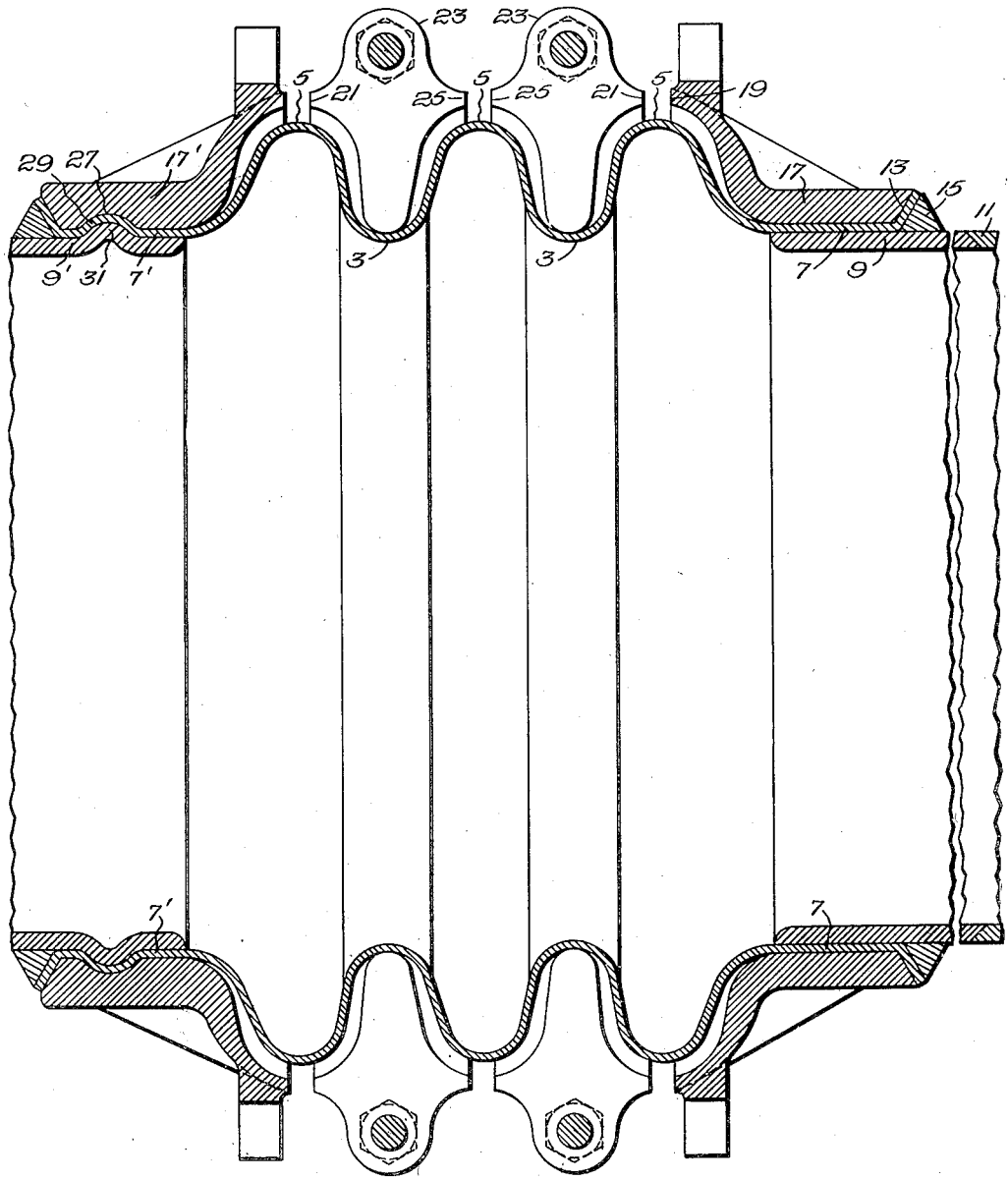

1,797,151

UNITED STATES PATENT OFFICE

LYMAN L. LORD, OF BOSTON, MASSACHUSETTS, ASSIGNOR TO E. B. BADGER & SONS COMPANY, OF BOSTON, MASSACHUSETTS, A CORPORATION OF MASSACHUSETTS

EXPANSION JOINT

Application filed February 14, 1927. Serial No. 167,914.

This invention relates to tubular expansion joints employed for coupling together lengths of rigid conduits forming elongated pipe lines and has for its object the production of a simple, strong and efficient connection between the expansion member of the joint and the pipe line, and particularly in cases where such expansion member is attached to a sleeve member and connected through such sleeve member to the adjoining end of the pipe line, as, for example, by being welded thereto.

The invention will be best understood by reference to the following description when taken in connection with the accompanying illustration of one specific embodiment thereof, while its scope will be more particularly pointed out in the appended claims.

The drawing shows a longitudinal, sectional elevation taken through an expansion joint embodying one form of the invention.

Referring to the drawing and to the illustrated embodiment of the invention disclosed therein, the expansion member of the joint is formed by a tubular sleeve or conduit 3 provided with one or more corrugations or circumferential enlargements 5, so as to provide a member capable of expansion and contraction in the direction of its axial length. Any number of such corugations may be employed, dependent on the service in which the joint is to be used, there being herein shown three such corrugations with two intermediate grooves or depressions. The expansion member is preferably, though not necessarily, of copper or other non-ferrous metal to enable it readily to undergo repeated expansions and contractions without deterioration.

At each opposite end, the sleeve-like end 7 of the expansion member fits over one end of the sleeve 9, the latter being preferably, though not necessarily, of ferrous metal, and of substantially, the same diameter as that of the main pipe line 11. The sleeve 9 projects for a substantial distance beyond the sleeve 7, and when the joint is installed the outer edges of the two sleeves, which, for convenience, are beveled as indicated in the drawing, are brought into close abutting relation to the adjacent conduit members 11 of the main pipe line, and, while there held, are then subjected to a welding operation so that the sleeves 9, and thereby the expansion joint, become united thereto as an integral part of the conduit pipe line.

To secure the expansion member to the sleeve 9, the sleeve like end 7 of the expansion member is provided with an outwardly turned edge 13, herein shown as of flared or tapered form, and the sleeve 9 is provided with a circumferential, raised wall 15 abutting against the flared edge 13 of the expansion member. In the form of the invention shown, the abutting wall 15 is formed by a filling of brazing metal which is so applied as thereby to braze the flared edge of the expansion member to the sleeve 9 and provide a brazed, fluid tight joint thereat.

Preferably the described joint is provided with devices to equalize and limit the contraction between the corrugated portions of the expansion member. For this purpose there is fitted upon each sleeve-like end of the expansion member an annular stop ring 17 which has an end shaped to fit against the conical seat presented by the inner side of the out-turned edge 13. The stop ring is provided with enlarged inwardly turned projecting edges 19 and is so shaped as to leave sufficient play or movement of the corrugated walls of the expansion member without restriction by the inner walls of the end ring, the latter, however, conforming generally to the shape of the corrugated walls when the latter are fully contracted.

The inwardly turned edges 19 of the opposite end rings, however, are arranged in opposition to, but normally separate from, the outwardly turned edge portions 21 of the intermediate ring members 23, the latter being located in the grooves of the corrugations and also shaped to conform generally to the corrugated walls when the expansion member is fully contracted.

The opposed edges of the end rings and the intermediate ring and the opposed edges 25 of the intermediate rings are separated at such a distance as to permit of the normal movement of contraction and separation, but to limit and equalize the contraction of the several corrugations. The reinforcing rings 23 and end limiting rings 17 may be of the usual material and construction well understood in devices of this class.

This method of attaching the expansion member to the sleeve 9 provides a brazed joint between the two, the joint being such, however, as to provide unusual strength. When the expansion member contracts, the joint is subject to a shearing stress. The substantial length of contact between the brazing material and the sleeve 9, however, provides great resistance to such shear, while the joint between the brazing material and the edge 13 is subjected to compression and substantially no shear. When the joint is subjected to expansion any tendency to separate the sleeve 7 from the brazing material is effectively resisted by the brazed joint which has a liberal area of contact over the entire surface of the flared edge 13. On the other hand, the brazed joint is readily accessible, so that location of any leakage occurring at the joint can be ascertained by the visible effects of such leakage and the latter can be stopped by a suitable repair of the joint.

In the construction shown at the right of the figure in the drawing, the annular stop ring 17 fits on the sleeve-like end 7 of the expansion member without being fixed thereon in a longitudinal sense, and the entire resistance is separation between the expansion member and the sleeve 9 is afforded by the brazing 15. At the left of the figure in the drawing is shown a slightly modified construction. In such modified form the walls of the stop ring 17' are somewhat thickened and the ring is provided with an internal, circumferential groove 27. After the ring has been placed in position on the sleeve 7', the sleeve 7' and the inner sleeve 9' are expanded, the former to provide an external raised corrugation 29 closely fitting the groove 27, and the latter to form a like corrugation 31 closely fitting the corrugation 29, the three parts being fixedly held together by the interfitting corrugation which materially increases the mechanical resistance between the sleeves 7' and 9' against separation.

While I have herein shown and described for the purpose of illustration one specific embodiment of the invention, it is understood that extensive deviations may be made therefrom without departing from the spirit thereof.

Claims:

1. An expansion joint having a corrugated tubular expansion member provided with external annular reinforcing means and annular end limiting members, said joint presenting at each end a tubular sleeve adapted to be connected to an adjoining member of a pipe line, the end of said expansion member fitting over one end of said sleeve and having an out-turned edge, the end limiting member fitting over said expansion member end and abutting against one side of the out-turned edge, the opposite side of said out-turned edge being integrally joined, as by brazing, to the said sleeve, and the joining material being raised against the edge of the expansion member to form an abutment thereagainst and provide a connection to the sleeve of substantial length.

2. An expansion joint having a tubular corrugated expansion member provided with external annular reinforcing means and annular end limiting members, said joint presenting at each end a tubular sleeve extending beyond the end of the expansion member and capable of being integrally joined to an adjoining member of a pipe line, the end of said expansion member fitting over one end of said sleeve and being integrally joined thereto as by brazing, and the end limiting member fitting over said expansion member but leaving accessible the joint between the expansion member and the sleeve.

3. An expansion joint having a tubular expansion member, said joint presenting at each end a tubular sleeve capable of being integrally joined to an adjoining member of a pipe line, the end of the expansion member fitting over one end of said sleeve and having an outwardly turned edge, the outer side of said outwardly turned edge being integrally joined as by brazing to said sleeve, and the joining material being raised against the edge of the expansion member to form an abutment thereagainst and provide a connection to the sleeve of substantial length.

4. An expansion joint having a corrugated tubular expansion member provided with external annular reinforcing means and annular stop rings, said joint presenting at each end a tubular sleeve extending beyond the end of the expansion member and adapted to be integrally connected to an adjoining member of a pipe line, the end of the expansion member fitting over one end of said sleeve and integrally joined thereto and the stop ring fitting over said expansion member end, the latter presenting an end abutment limiting the outward movement of the stop ring.

5. An expansion joint having a corrugated tubular expansion member provided with external, annular, reinforcing means, said joint presenting at each end a tubular sleeve extending beyond the end of the expansion member and integrally joined thereto, said sleeve being capable of being connected to an adjoining member of a pipe line, the end of said expansion member having a cylindrical portion fitting over the cylindrical end of the sleeve and having at its end an out-turned flange, an outer annular end limiting member shaped to conform to the adjoining corrugation of the expansion member, said end limiting member fitting over the cylindrical portion of said expansion member and abutting against one side of said out-turned flange, and the sleeve beyond the cylindrical portion thereof presenting a wall abutting against the opposite side of said out-turned flange.

In testimony whereof, I have signed my name to this specification.

LYMAN L. LORD.